United States Patent
Krummrich

(10) Patent No.: US 7,248,398 B2
(45) Date of Patent: Jul. 24, 2007

(54) METHOD FOR DETERMINING THE GAIN SPECTRUM OF A RAMAN AMPLIFIER IN A WDM-TRANSMISSION SYSTEM

(75) Inventor: Peter Krummrich, München (DE)

(73) Assignee: Siemens Aktiengesellschaft, Munich (DE)

( * ) Notice: Subject to any disclaimer, the term of this patent is extended or adjusted under 35 U.S.C. 154(b) by 13 days.

(21) Appl. No.: 10/525,027

(22) PCT Filed: Jul. 7, 2003

(86) PCT No.: PCT/DE03/02266

§ 371 (c)(1),
(2), (4) Date: Feb. 22, 2005

(87) PCT Pub. No.: WO2004/021612

PCT Pub. Date: Mar. 11, 2004

(65) Prior Publication Data

US 2005/0270634 A1    Dec. 8, 2005

(30) Foreign Application Priority Data

Aug. 27, 2002 (DE) ............................. 102 39 304

(51) Int. Cl.
*H01S 3/00* (2006.01)
*H04B 10/08* (2006.01)
(52) U.S. Cl. ......................................... 359/334; 398/37
(58) Field of Classification Search ................ 359/334; 398/37

See application file for complete search history.

(56) References Cited

U.S. PATENT DOCUMENTS

| | | | | |
|---|---|---|---|---|
| 5,471,334 A | * | 11/1995 | Masuda et al. | 359/337 |
| 5,561,551 A | * | 10/1996 | Iwasaki et al. | 359/337 |
| 5,574,534 A | * | 11/1996 | Nogiwa et al. | 359/337 |
| 5,677,781 A | * | 10/1997 | Mori et al. | 398/26 |
| 5,781,322 A | * | 7/1998 | Uchiyama et al. | 398/38 |
| 6,624,927 B1 | * | 9/2003 | Wong et al. | 359/334 |
| 6,721,481 B2 | * | 4/2004 | Terahara et al. | 385/122 |
| 6,760,150 B2 | * | 7/2004 | Goto et al. | 359/337.12 |
| 6,847,478 B1 | * | 1/2005 | Tanaka et al. | 359/334 |
| 6,934,076 B1 | * | 8/2005 | Goobar et al. | 359/337 |
| 2002/0044336 A1 | | 4/2002 | Tanaka et al. | |
| 2002/0054733 A1 | * | 5/2002 | Kagi et al. | 385/27 |
| 2002/0071173 A1 | | 6/2002 | Lee et al. | |
| 2005/0147370 A1 | * | 7/2005 | Yusoff et al. | 385/125 |
| 2005/0259315 A1 | * | 11/2005 | Debut et al. | 359/334 |

FOREIGN PATENT DOCUMENTS

| | | |
|---|---|---|
| EP | 1 130 825 A2 | 9/2001 |
| WO | WO 00/73826 A2 | 12/2000 |
| WO | WO 02/30018 A2 | 4/2002 |

* cited by examiner

Primary Examiner—Deandra M. Hughes

(57) ABSTRACT

The invention relates to a method and device for determining the gain spectrum of a Raman amplifier having an optical amplifier, which is connected in incoming circuit thereto, in a section of a WDM transmission system. A number of spectra are recorded at the output of the Raman amplifier during which the optical amplifier or the Raman amplifier is switched on and off and a high amplified spontaneous emission is generated at the input of the Raman amplifier. Afterwards, the gain spectrum is determined on the basis of the recorded spectra.

9 Claims, 1 Drawing Sheet

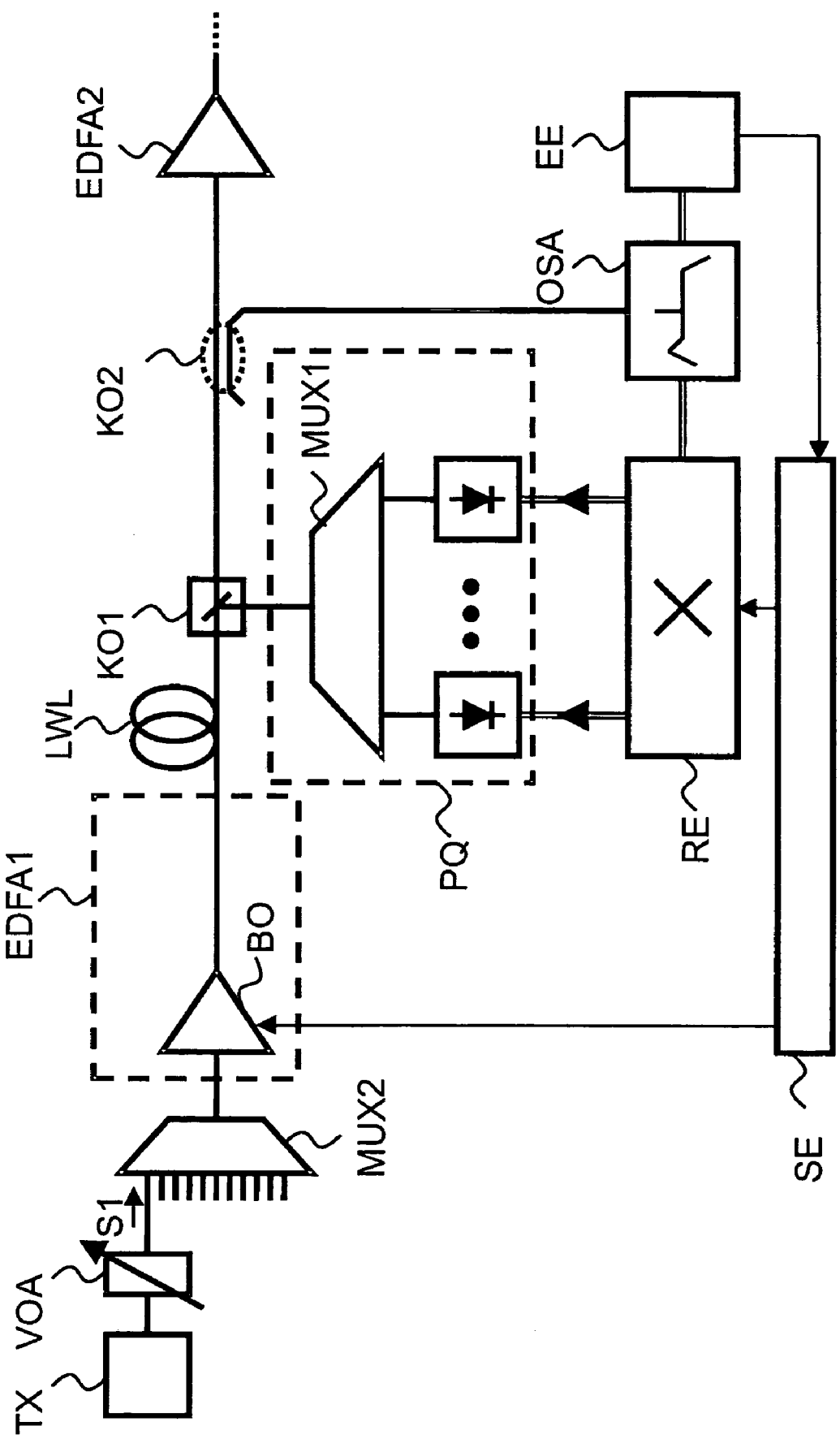

METHOD FOR DETERMINING THE GAIN SPECTRUM OF A RAMAN AMPLIFIER IN A WDM-TRANSMISSION SYSTEM

CROSS REFERENCE TO RELATED APPLICATION

This application is the U.S. National Stage of International Application No. PCT/DE2003/002266, filed Jul. 7, 2003 and claims the benefit thereof. The International Application claims the benefits of German application No. 10239304.4 DE filed Aug. 27, 2002, both of the applications are incorporated by reference herein in their entirety.

FIELD OF THE INVENTION

The invention relates to a method and an arrangement for determining the gain spectrum of a Raman amplifier in accordance with the characterizing clauses of the claims.

BACKGROUND OF THE INVENTION

The use of distributed Raman amplification in transmission fibers permits a significant improvement in the characteristics of optical transmission systems. For example, for a given optical signal-to-noise ratio at the end of a link, the use of this technique enables the length of the individual link sections to be increased or more link sections can be bridged.

When the technique is used in WDM systems, the Raman gain should have a flat gain spectrum, so that all the channels benefit to the same extent. On the other hand, the system improvement which can be obtained is limited by the channel with the lowest gain. The higher gain of the other channels corresponds to an inefficient utilization of the pump power deployed and, if the differences are very large, can degrade their signal quality by doubled Rayleigh backscattering.

A flat gain spectrum across a wide range of wavelengths can be obtained by the use of several pumping signals at different wavelengths. However, the desired gain spectrum is achieved only for a quite particular distribution of the power at the individual pumping wavelengths. These must be adjusted for the required gain, the position of the pumping wavelengths relative to the signal wavelengths, the insertion loss between the pumping source and the transmission fiber, and the characteristics of the transmission fiber.

The characteristics of the transmission fiber which are relevant for the Raman amplification can have such a wide distribution from one sample to another, even for fibers of one type (SSMF, LEAF, TrueWave, . . . ), that there are detectable differences in the resulting gain spectrum. In addition, when the system is installed nothing is generally known about the insertion loss between the pumping source and the actual input to the transmission fiber. It is therefore only possible to set up a desired gain spectrum when the system is being commissioned if the actual gain spectrum which applies over each link section can be measured, and the pumping powers appropriately adjusted if there are deviations.

Until now there have been essentially four known methods for setting the pumping powers of the Raman sources when a system is being commissioned. The first method can be used if the system is commissioned with its maximum number of channels. In this case, the link sections are started up one after another, starting with the one immediately after the transmitter. As all the channels are already present during commissioning, they can be used as a test signal spectrum for a gain measurement. The signal spectrum at the output from the link section concerned is first measured with the Raman pumping source switched off, then the spectrum with the source switched on. The ratio of the two spectra, or the difference in the level in dB, as applicable, immediately gives the on/off gain spectrum of the Raman amplifier. An exemplary embodiment of this type is described in EP 1 130 825 A2. Here, the gain measurement is carried out as a function of a specific configuration of active channels, which is undesirable when the system is being commissioned.

Unfortunately this method can seldom be used in practice, because most systems are commissioned using only a very small number of channels, and only later are they upgraded. It would indeed be possible in principle to measure and adjust the gain spectrum using 2a only the signal channels already initially available, since the gain in the case of the channels which are still missing plays no part. It would then be necessary to remeasure and tune the gain spectrum before or during the commissioning of additional channels. The switching off of the Raman pumping source which this requires would disrupt the transmission of the channels which are already present. For this reason, even during the initial commissioning of the system the gain spectrum should be measured and tuned for all the channels which will be present at maximum capacity.

In the case of the second known method for adjusting the pump powers, those channels which are not present at initial commissioning are replaced by a laser source with tunable wavelength. The determination of the signal spectrum at the output from the link section with the Raman pumping source switched off or on, as appropriate, thus requires many individual measurements, between which the tunable laser source must be switched over to the next channel. Apart from requiring a significantly longer measurement time, the method also requires a facility for communicating with the source, so that the latter can be informed when it should set which wavelength. In addition, the preparation of the source and the coupling of its output signal into the transmission system can present problems.

In order to be able to forgo a tunable laser source, a third method for the measurement of the gain spectrum has been proposed, which manages completely without a test signal at the input to the link section. This method utilizes the effect that the stimulated emission which is responsible for the gain is invariably accompanied by the generation of spontaneous emissions. For this reason, the spectrum of the ASE generated by the Raman amplifier is measured, and an attempt made to calculate the gain spectrum from this. Since the relationship between the gain spectrum and the spectrum of the ASE is very complex for distributed Raman amplifiers, the calculation is very resource intensive and error-prone.

The fourth method proposed for adjusting the pumping powers of the Raman pumping sources does completely without a measurement of the gain spectrum, and adjusts the pumping powers solely by reference to the specified fiber type for the transmission fiber. Since the method therefore has no knowledge of either the exact fiber characteristics or the insertion loss between the pumping source and the transmission fiber, the resulting gain spectrum can deviate significantly from that actually desired.

Examples of the state of the art, in which some of the methods itemized above are used, are set out below.

WO 00/73826 A2 presents an optical transmission system which has various amplifier units connected in series. The amplifier functions are checked either in operation or by means of supplementary units by gain measurements at the wavelength of the signal, and the pumping powers are adjusted correspondingly. For test measurements of the amplifier gain, use is made of both broadband and narrowband light sources as the ASE source, depending on the number of channels to be investigated.

US 2002/0071173 A1 and US 2002/0044336 A1 also show optical amplifier units in a transmission link, which can be controlled through the pumping power, for which in each case a Raman amplifier is put in circuit upstream from the optical fiber amplifier. In US 2002/0071173 A1, the amplifier contains a wavelength-dependent tunable filter. In order to obtain a flat gain spectrum, the gain spectra of the amplifier unit are checked and the filter adjusted accordingly. In US 2002/0044336 A1, the amplifier module contains a unit which determines whether the input signal has been interrupted due to noise effects in the Raman amplifier. The pumping power of the Raman source is adjusted according to the signal detection, by which means the noise level can also be regulated.

US 2002/0054733A1 discloses a typical transmission section with a Raman amplifier and an optical fiber amplifier as a booster, upstream from the Raman amplifier, for which the Raman gain spectrum is determined by a comparison of the spectrum of the signals transmitted over the active channels against a stored spectrum. Using a regulating unit, the power of the pumping source for the Raman amplifier is varied in such a way that minimal deviations occur between the spectra which are compared, from which the Raman gain can be derived.

SUMMARY OF THE INVENTION

It is the object of the invention to specify a method, and in addition an arrangement, for the determination of the gain spectrum which enable the powers of the pumping sources for the Raman amplifier to be simply adjusted, and with which the disadvantages mentioned above are avoided.

This object is achieved, in respect of the method, by a method with the characteristics of the claims, and in respect of the device by an arrangement with the characteristics of the claims.

Advantageous developments of the invention are specified in the subclaims.

The proposed method in accordance with the invention uses as the test signal the amplified spontaneous emission, ASE, which is generated by the optical amplifiers present in the system, for example Erbium-doped fiber amplifiers, EDFAs. Since the fiber amplifiers, the EDFAs, must have a flat gain spectrum over the entire range of signal wavelengths, they will also generate ASE over the entire wavelength range in which the gain spectrum of the distributed Raman amplifiers must be measured using a broadband pumping source. The ASE spectrum has a different graph from the gain spectrum of the EDFA fiber amplifiers. However, the exact shape of the ASE spectrum for the EDFA fiber amplifiers does not affect the measurement of the gain of the Raman amplifiers. The Raman gain spectrum which is to be measured is given by the ratio of spectra at the output from the link section with the Raman pumping source switched off or on, as applicable, and does not depend on the shape of the individual spectra.

In principle, the use of the ASE for the EDFA fiber amplifiers would permit the gain spectrum of the distributed Raman amplifiers to be measured with absolutely no signal channels being present. For the purpose of protecting the EDFA fiber amplifiers, WDM transmission systems which have been developed to the full product stage commonly provide safeguards to prevent the EDFA fiber amplifiers being switched on when there are no channels present. Advantageously, the presence of signal channels does not disrupt the proposed method, because the ratio of the spectra at the exit from the fiber can also be determined with any arbitrary number of channels.

One problem in measuring the gain spectrum is presented by the ASE generated by the distributed Raman amplifier itself. This only arises with the pumping source switched on, and can therefore falsify the result of the measurements. The ASE generated by the distributed Raman amplifiers themselves can be determined by a third measurement, and calculated out. To do so, an additional measurement is made of the spectrum at the exit from the fiber section, with the Raman pumping source switched on but with the EDFA fiber amplifier before the link section switched off. The spectral components observed in this case must be subtracted from the measurement made with the pumping source switched on and the EDFA fiber amplifier switched on.

The interference effect of the ASE generated by the Raman amplifier itself is greater the nearer the link section lies to the input into the overall system. In the first link sections, the power of the ASE generated by the EDFA fiber amplifiers is still comparatively small. Only in the link sections further downstream does the ASE, generated in the preceding amplifiers and used as the measurement signal, become greater than the component which the Raman amplifier contributes in the link section under consideration.

The accuracy of the measurement of the gain spectra in the front link sections can be increased by an artifice. When operated in regular mode, the EDFA fiber amplifier (booster) before the first link section generates comparatively little ASE, because it works with a high input level. Modern transmission systems generally provide VOAs (variable optical attenuators), adjustable attenuation elements with which the level of the individual transmitters can be balanced. These VOA attenuation elements can also be utilized to reduce the input level into the booster. With lower input levels the boosters, which are regulated to give constant output power, generate more ASE. In this way it is possible to select the ASE attributable to the booster so that it is stronger than that from the Raman amplifier.

If the WDM transmission system works with several signal bands, which are processed in separate EDFA fiber amplifiers or other discrete amplifiers, the ASE spectra of these amplifiers can be used for the measurement of the gain spectrum of the distributed Raman amplifier. Since the distributed Raman amplifier must then process all the signal bands, the gain measurement should extend across them. Each of the discrete amplifiers does indeed generate ASE in only one band. However, the aggregate signal from the ASE for all the discrete amplifiers does cover the entire range of signal wavelengths. It is advantageously possible to arrange several fiber amplifiers or Raman amplifiers in a section of the transmission link to amplify a WDM signal in different spectral ranges, whereby the gain spectrum of one of the Raman amplifiers is determined using the method in accordance with the invention.

BRIEF DESCRIPTION OF THE DRAWINGS

An exemplary embodiment of the invention is explained in more detail below by reference to the drawing.

This shows:

FIG. 1: an arrangement for carrying out the method in accordance with the invention in a first transmission section.

DETAILED DESCRIPTION OF THE INVENTION

As an exemplary embodiment, consider an arrangement as shown in FIG. 1 for carrying out the method in accordance with the invention, which shows a first transmission section as a segment of a WDM transmission system. Connected to this transmission section is a Raman amplifier, which has a pumping source PQ with several pumping signals. For the purpose of generating the Raman pump radiation, the pumping source PQ at the end of the link section uses four laser diodes. Pumping signals from the pumping source PQ are combined together with the help of a wavelength-selective multiplexer MUX. The laser diodes generate signals with wavelengths of 1423 nm, 1436 nm, 1453 nm and 1467 nm. A band filter KO1 feeds the pump signals into the signal path or into an OWG transmission fiber, as applicable, in the opposite direction from the direction of propagation of the transmitted signals.

Downstream from the band filter KO1 of the pumping source PQ in the signal path is a coupler KO2. With the help of an optical spectrum analyzer OSA connected to the coupler KO2, the spectrum at the output from the link section can be measured.

Upstream from the OWG transmission fiber is an amplifier, as a booster BO. The amplifier used is an Erbium-doped fiber amplifier, EDFA1. However, other optical amplifiers such as semiconductor amplifiers, Thylium-doped fiber amplifiers, or discrete Raman amplifiers, could be used as the booster BO. Upstream from the booster BO is a multiplexer MUX2 for combining the channels which are to be transmitted in a WDM signal. Further optical amplifiers EDFA2, or generally designated EDFAs=EDFA1, EDFA 2, . . . , are connected along the transmission link downstream from the coupler KO2.

Contained in this arrangement is a control device SE for switching the pumping sources of the fiber amplifier and the Raman amplifier on and off.

During commissioning there should be, in the example chosen, only a single channel S1 outbound from a transmission unit TX, with a downstream adjustable attenuation element, VOA. This single channel S1 is sufficient to disable the safety shutdown of the fiber amplifier EDFA. After the transmitter TX has been switched on, the attenuation element VOA is initially adjusted so that the channel S1 reaches its set level at the input to the booster BO. After this, the booster BO is switched on. Then, the insertion attenuation of the attenuation element VOA is increased up to the point when the booster BO produces sufficiently amplified spontaneous emission, ASE.

During a first measurement of the spectrum SP1 at the output from the section link, made using the optical spectrum analyzer OSA, the Raman pumping source remains switched off. After this, the booster BO is switched off and a second spectrum SP2 is measured with the Raman pumping source PQ switched on. For a third measurement of a third spectrum SP3, the booster BO is switched on again. For the purpose of calculating the gain spectrum of the Raman amplifier, the second spectrum SP2 is first subtracted from the third spectrum SP3 (both spectra in W or W/Hz, as applicable), and this difference is then divided by the first spectrum SPI (again in W or W/Hz, as applicable). This ratio, (SP3−SP2)/SP1, corresponds to the spectrum of the on/off gain of the Raman amplifier. Connected to the optical spectrum analyzer OSA are a unit EE, for analyzing the spectra recorded by the optical spectrum analyzer OSA, and a regulator RE for controlling the spectral power components of the pumping source PQ to re-regulate the gain spectrum GS. The analysis unit EE is also connected to the control device SE for the purpose of synchronizing the switching of each of the amplifiers, on and off, while the desired spectra are recorded.

Depending on the configuration of the transmission links, it may be possible to ignore the amplified spontaneous emission from the Raman amplifier, i.e. to save the measurement of the second spectrum SP2. In this case, only two measurements are carried out, with the pumping source switched on and off for the Raman amplifier, and the optical amplifier switched on. In this case, the gain spectrum GS is determined as the ratio SP3/SP1 of the third spectrum to the first.

After level adjustment for the Raman amplifier in the first transmission link section, the following fiber amplifier EDFA2 in the second link section is put into operation. Gain measurement for the Raman amplifier in the second link section can then be carried out. The first spectrum SP1 is again measured with the pumping source switched off, the second spectrum SP2 with the pumping source switched on and EDFA2 which precedes the link section switched off, and the third spectrum SP3 with the Raman pumping source switched on and EDFA2 switched on. The calculation of the gain spectrum is carried out as described above. The gain spectra for the following link sections are determined in the same way.

The invention claimed is:

1. A method for determining a gain spectrum for a Raman amplifier located downstream from an optical fiber amplifier in a WDM transmission system, comprising:
    switching the Raman amplifier into one respective amplifier state selected from an on state and an off state;
    measuring an optical spectra at an output of the Raman amplifier with a pumping source when the optical fiber amplifier is switched into an active state to cause amplified spontaneous emission; and
    determining the gain spectrum from these spectra, wherein a first spectrum is measured with the pumping source for the Raman amplifier switched off and the pumping source for the optical fiber amplifier switched on, a third spectrum is measured with the pumping source for the Raman amplifier switched on and the pumping source for the optical fiber amplifier switched on, and the gain spectrum for the Raman amplifier is calculated according to the following rule:

Gain Spectrum=(Third Spectrum)/(First Spectrum).

2. A method for determining a gain spectrum for a Raman amplifier located downstream from an optical fiber amplifier in a WDM transmission system, comprising:
    switching the Raman amplifier into one respective amplifier state selected from an on state and an off state;
    measuring an optical spectra at an output of the Raman amplifier with a pumping source when the optical fiber amplifier is switched into an active state to cause amplified spontaneous emission; and
    determining the gain spectrum from these spectra, wherein a first spectrum is measured with the pumping source for the Raman amplifier switched off and the pumping source for the optical fiber amplifier switched on, a second spectrum is measured with the pumping source for the Raman amplifier switched on and the pumping source for the optical fiber amplifier switched off, a third spectrum is measured with the pumping source for the Raman amplifier switched on and the pumping source for the optical fiber amplifier switched on, and the gain spectrum for the Raman amplifier is calculated according to the following rule:

Gain Spectrum=(Third Spectrum−Second Spectrum)/(First Spectrum).

3. The method in accordance with claim 1, wherein further spectra are measured for transmission links with additional optical fiber amplifiers and additional Raman amplifiers by switching their pumping sources on and off and from this the gain spectra of the Raman amplifiers are determined.

4. The method in accordance with claim 1, wherein during the commissioning of a transmission link having several sections containing an optical fiber amplifier and a Raman amplifier the determination of the gain spectra is carried out section by section.

5. The method in accordance with claim 1, wherein for determining the gain spectrum, channel signals are attenuated so that a high level of amplified spontaneous emission arises at the output of the optical fiber amplifier.

6. An arrangement for determining the gain spectrum of a Raman amplifier located downstream from an optical fiber amplifier in a WDM transmission system, comprising:

a control device to selectively switch to one respective state selected from an on state and off state the pumping sources for the Raman amplifier and to activate the optical fiber amplifier when the optical fiber amplifier is in the active state causing amplified spontaneous emission;

spectra generated with the pumping sources for the Raman amplifier switched in one of the respective on and off states are measured at an optical spectrum analyzer downstream from the Raman amplifier; and a gain spectrum determined from these spectra.

7. The arrangement in accordance with claim 6, wherein a unit for analyzing the spectra recorded by the optical spectrum analyzer and a regulator for controlling the spectral power components of the pumping source are connected to the optical spectrum analyzer.

8. The arrangement in accordance with claim 6, wherein the optical fiber amplifier provided is an Erbium-doped fiber amplifier, a semiconductor amplifier, or a discrete Raman amplifier.

9. The arrangement in accordance with claim 6, wherein an attenuation device is located upstream from the optical fiber amplifier and when a measurement is being made the attenuation device suppresses channel signals so that a signal with a high level of amplified spontaneous emission is provided to the Raman amplifier.

* * * * *